US009699270B2

(12) United States Patent
Kande et al.

(10) Patent No.: US 9,699,270 B2
(45) Date of Patent: Jul. 4, 2017

(54) METHOD FOR COMMISSIONING AND JOINING OF A FIELD DEVICE TO A NETWORK

(71) Applicant: ABB Schweiz AG, Baden (CH)

(72) Inventors: Mallikarjun Kande, Bangalore (IN); Ravish Kumar, Sitamarhi (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/223,643

(22) Filed: Jul. 29, 2016

(65) Prior Publication Data

US 2017/0034308 A1 Feb. 2, 2017

Related U.S. Application Data

(63) Continuation of application No. PCT/IB2015/050708, filed on Jan. 30, 2015.

(30) Foreign Application Priority Data

Jan. 31, 2014 (IN) .......................... 6171/CHE/2013

(51) Int. Cl.
  *H04M 3/00* (2006.01)
  *H04L 29/08* (2006.01)
  *H04W 4/00* (2009.01)

(52) U.S. Cl.
  CPC ............ *H04L 67/34* (2013.01); *H04L 67/125* (2013.01); *H04L 67/18* (2013.01); *H04W 4/005* (2013.01); *H04W 4/006* (2013.01)

(58) Field of Classification Search
  CPC ....... H04L 67/34; H04L 67/125; H04L 67/18; H04L 12/28; H04L 2012/2841;
  (Continued)

(56) References Cited

U.S. PATENT DOCUMENTS 6,801,782 B2 * 10/2004 McCrady .............. G01S 5/021
  375/347
7,356,601 B1 * 4/2008 Clymer ............... H04L 63/0272
  709/223
(Continued)

OTHER PUBLICATIONS

International Search Report, PCT/IB2015/050708, ABB Technology Ltd., Apr. 29, 2015.
(Continued)

*Primary Examiner* — Mahendra Patel
(74) *Attorney, Agent, or Firm* — Barnes & Thornburg LLP

(57) ABSTRACT

The invention relates to a method for joining of a first field device to a wireless sensor actuator network using a configuration tool. The wireless sensor actuator network comprises a plurality of interconnected field devices and gateway for connecting the interconnected field devices to a plant automation network comprising controllers and network manager. The method comprises receiving device information associated with the first field device, transmitting a commissioning request for the first field device, the commissioning request comprising device information and geographical location information of the first field device, receiving commissioning information comprising a session key, a network key and routing information, and commissioning the first field device using the received commissioning information for joining the said field device to the wireless sensor actuator network.

6 Claims, 5 Drawing Sheets

(58) Field of Classification Search
CPC ...... H04L 12/2807; H04L 29/08; H04W 4/00; H04W 4/005; H04W 24/02; H04W 4/043; H04W 4/006; H04B 7/00
USPC .......................................................... 455/418
See application file for complete search history.

(56) References Cited

U.S. PATENT DOCUMENTS

| | | | | |
|---|---|---|---|---|
| 8,503,330 B1* | 8/2013 | Choong | ................ | H04W 24/02 370/254 |
| 8,942,133 B2* | 1/2015 | Kumar | ................ | H04L 63/0428 370/252 |
| 2008/0218334 A1* | 9/2008 | Pitchers | .............. | H04L 41/0893 340/539.1 |
| 2009/0066473 A1* | 3/2009 | Simons | ................ | G01S 5/0027 340/3.1 |
| 2010/0153709 A1* | 6/2010 | Thomas | ................ | G06F 21/445 713/155 |
| 2010/0180019 A1* | 7/2010 | Elston, III | .......... | H04L 12/2809 709/222 |
| 2011/0025469 A1* | 2/2011 | Erdmann | ............ | H04L 12/2809 340/10.1 |
| 2011/0149803 A1* | 6/2011 | McCormack | ......... | H04W 8/005 370/254 |
| 2012/0007511 A1* | 1/2012 | Choong | ................ | H05B 37/02 315/152 |
| 2012/0082062 A1* | 4/2012 | Mccormack | .......... | H04W 48/14 370/254 |
| 2012/0273581 A1* | 11/2012 | Kolk | ...................... | F24F 11/006 236/91 D |
| 2013/0109406 A1* | 5/2013 | Meador | ................. | H04L 67/125 455/456.1 |
| 2016/0255516 A1* | 9/2016 | Hill | ......................... | H04W 4/02 |

OTHER PUBLICATIONS

Written Opinion, PCT/IB2015/050708, ABB Technology Ltd., Apr. 29, 2015.
European Patent Office, International Preliminary Report on Patentability for PCT/IB2015/050708, Aug. 2, 2016, 7 pages.

* cited by examiner

METHOD FOR COMMISSIONING AND JOINING OF A FIELD DEVICE TO A NETWORK

CROSS-REFERENCE TO RELATED APPLICATIONS

This application is a continuation of International Application Serial No. PCT/IB2015/050708, filed Jan. 30, 2015, which claims priority to Indian Patent Application No. 6171/CHE/2013, filed Jan. 31, 2014. The entire disclosures of the foregoing applications are hereby incorporated by reference.

FIELD OF INVENTION

The present invention relates generally to the field of wireless communication and more specifically to commissioning and joining of a field device to a wireless sensor actuator network.

BACKGROUND

A wireless sensor actuator network comprises a plurality of field devices embedded with sensor nodes, distributed spatially in a process plant. During joining of the field devices into the wireless sensor actuator network, security considerations regarding integrity, confidentiality and authentication of the connection have to be addressed. Another aspect that needs to be considered is the time for joining/rejoining of the field devices to the wireless sensor actuator network which is a critical parameter indicative of the performance of the wireless sensor actuator network. As per state of art, the time for joining or rejoining of a field device becomes longer when security is more complex. For instance, in a standardized communication protocol like the Wireless Highway Addressable Remote Transmitter communication protocol, more commonly referred to as the WHART, the field device joining process is secured by a 128 bit AES encryption mechanism, which results in longer time for joining or rejoining of the field device.

In general, configuring and joining of a field device to the wireless sensor actuator network is often involves a series of time consuming processes which provide a high level of reliability in the delivery of data while sacrificing temporal efficiency. Generally, the time for joining of a field device to a wireless sensor actuator network is divided into the configuration time and the joining time. The time taken for configuring of the field device initially, using maintenance port is the configuration time, and the time taken for the field device to become part of the wireless sensor actuator network is the joining time. Conventionally, the joining process for the field device includes a plurality of steps such as communicating with the network manager, advertising of joining request, receiving an acknowledgement and allocating the session key after joining the network. The exchanging of network credentials like network ID, join key, session key, network key, Graph ID and slot number by the field devices and the network manager is done automatically over the air during the joining process. In light of the mentioned steps, the time for joining is affected by a plurality of indeterminate parameters like non-availability of the network manager, network size, number of hops in the wireless sensor actuator network, distance from the gateway, device processing speed, etc., therefore resulting in inefficient and unpredictable joining.

Therefore, in light of the above discussion, there is a need for a method and system for joining of a field device into a wireless sensor actuator network.

OBJECTS OF THE INVENTION

The object of the invention is to propose a method for joining of a field device to a wireless sensor actuator network by generating field device credentials by a network manager and configuring the said field device by a configuration tool. The invention proposes a method for fast joining and rejoining of a field device to a wireless sensor actuator network. The object of the invention is also to propose a system to perform the said method of the invention.

SUMMARY OF THE INVENTION

The above-mentioned shortcomings, disadvantages and problems are addressed herein which will be understood by reading and understanding the following specification.

The present invention discloses a method for commissioning and joining of a first field device to a wireless sensor actuator network in a process plant using a configuration tool. The wireless sensor actuator network comprises a plurality of interconnected field devices and gateway for connecting the plurality of interconnected field devices to a plant automation network comprising a plurality of controllers and network manager.

The method comprises receiving device information associated with the first field device, transmitting a commissioning request for the first field device, receiving commissioning information for the first field device, and commissioning the first field device (53) using the received commissioning information for joining the said field device to the wireless sensor actuator network. The device information comprises a unique device identifier associated with the first field device. The commissioning request comprises the received device information associated with the first field device, and geographical location information of the first field device. Commissioning information comprises a session key, a network key and routing information which includes a list of neighboring field devices within a predetermined wireless communication range of the first field device.

In an embodiment, the method further comprises generating the session key and the network key, by the network manager based on the unique device identifier associated with the first field device. The session key is used for pairwise communications between the first field device and the network manager, and the network key is used in data link layer service for hop-to-hop authentication. In an embodiment, the method further comprises generating the list of neighboring field devices, by the network manager, based on the geographical location of the first field device and one or more routing tables. In an embodiment, the method further comprises depreciating the session key by network manager after a predetermined duration of time. In an embodiment, the method further comprises sending process data to a controller from the plurality of controllers by the first field device, upon joining the wireless sensor actuator network. In an embodiment, the method further comprises setting a joining key to the depreciated session key by network manager.

In another aspect, the current invention discloses a system for commissioning and joining of a first field device to a wireless sensor actuator network, wherein the wireless sensor actuator network comprises a plurality of field devices and a gateway for connecting the plurality of interconnected field devices to a plant automation network comprising a plurality of controllers. The system comprises a network manager communicatively coupled to the gateway and configured to generate a session key based on the unique device identifier associated with the first field device and generate routing information including a list of neighboring field devices, based on geographical location of the first field device and one or more routing tables; and a configuration tool configured to receive device information associated with the first field device, wherein the device information comprises a unique device identifier associated with the first field device, transmit a commissioning request for the first field device, wherein the commissioning request comprises the received device information associated with the first field device, and geographical location information of the first field device, receive commissioning information for the first field device, wherein commissioning information comprises a session key, a network key and routing information corresponding to the first field device, wherein routing information comprises a list of neighboring field devices within a predetermined wireless communication range of the first field device and commission the first field device using the received commissioning information for joining the said field device to the wireless sensor actuator network.

In an embodiment the first field device is configured to send process data to a controller from the plurality of controllers, upon joining the wireless sensor actuator network via the gateway. In an embodiment, the network manager has an Authenticated Device List (ADL) comprising listing of one or more field devices of the wireless sensor actuator network and a session allocated device list comprising listing one or more field devices having commissioning information generated therefor.

Systems and methods of varying scope are described herein. In addition to the aspects and advantages described in this summary, further aspects and advantages will become apparent by reference to the drawings and with reference to the detailed description that follows.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
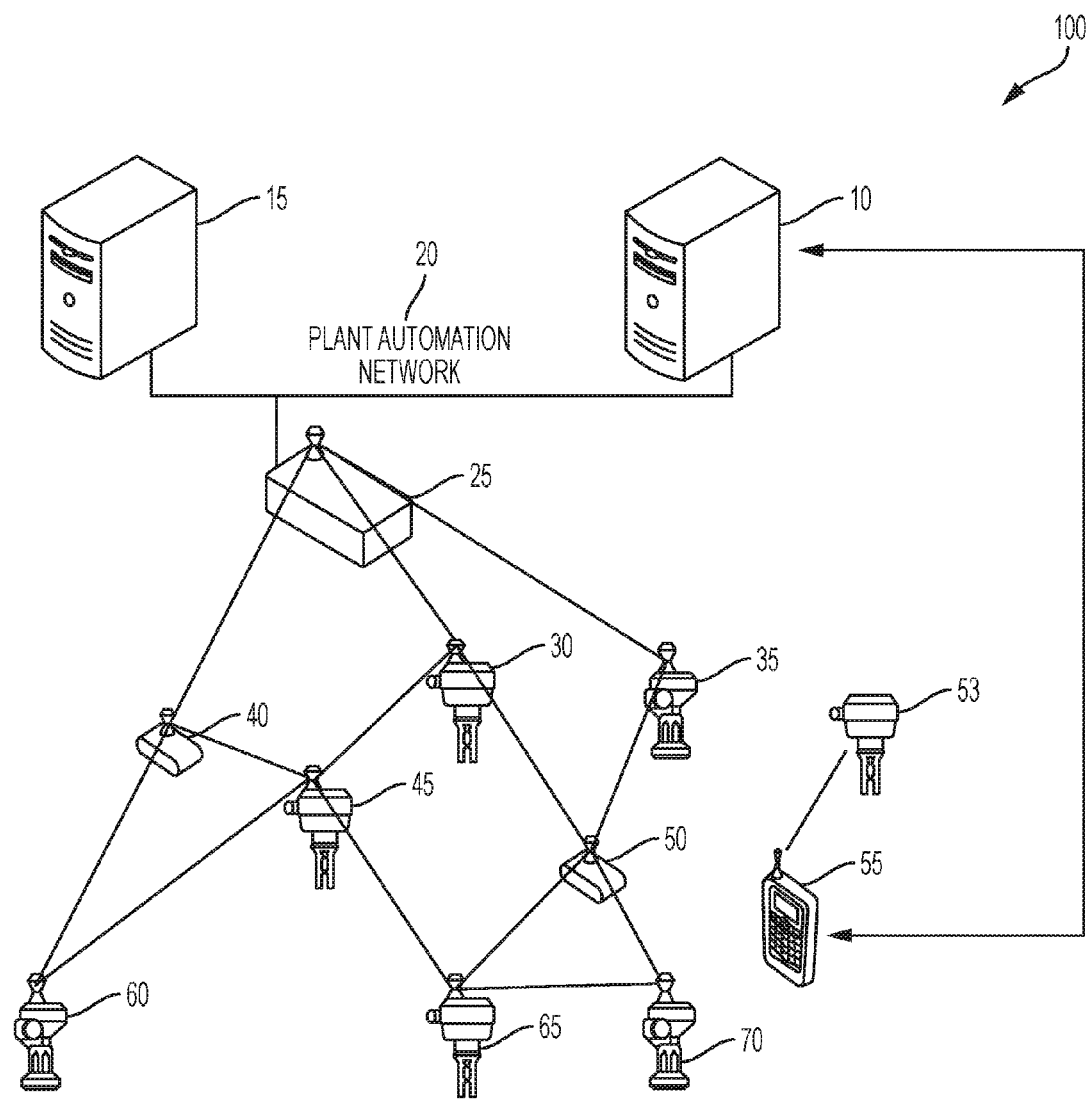
FIG. 1 illustrates a system for commissioning and joining of a field device to a wireless sensor actuator network; in accordance with the current invention.

FIG. 1 illustrates a system 100 for commissioning and joining of a first field device 53 to a wireless sensor actuator network using a configuration tool 55; in accordance with the current invention. The system 100 includes a plurality of field devices (shown in the figure as field device 30, field device 35, field device 53, field device 45, field device 60, field device 65 and field device 70) connected in a mesh to form the wireless sensor actuator network. The wireless sensor actuator network includes a gateway 25 and one or more routers (shown in the figure as router 40 and router 50) for supporting communication among the field devices.

The gateway 25 connects the wireless sensor actuator network to the plant automation network 20. The plant automation network 20 includes the necessary control components such as controllers, relay interfaces, I/O interfaces, configuration and automation servers (shown in figure as server 15 and server 10), operator stations, etc. A configuration tool 55 is provided for commissioning and joining the first field device 53 to the wireless sensor actuator network. In an embodiment, the configuration tool is a handheld device used by a plant operator during commissioning of the field devices of the plant. Additionally, a network manager is provided for managing the generating of field device credentials such as session key, network key, join key etc. along with the necessary routing information. This is further explained in the detail description of FIG. 2 and FIG. 3.

Figure 2:
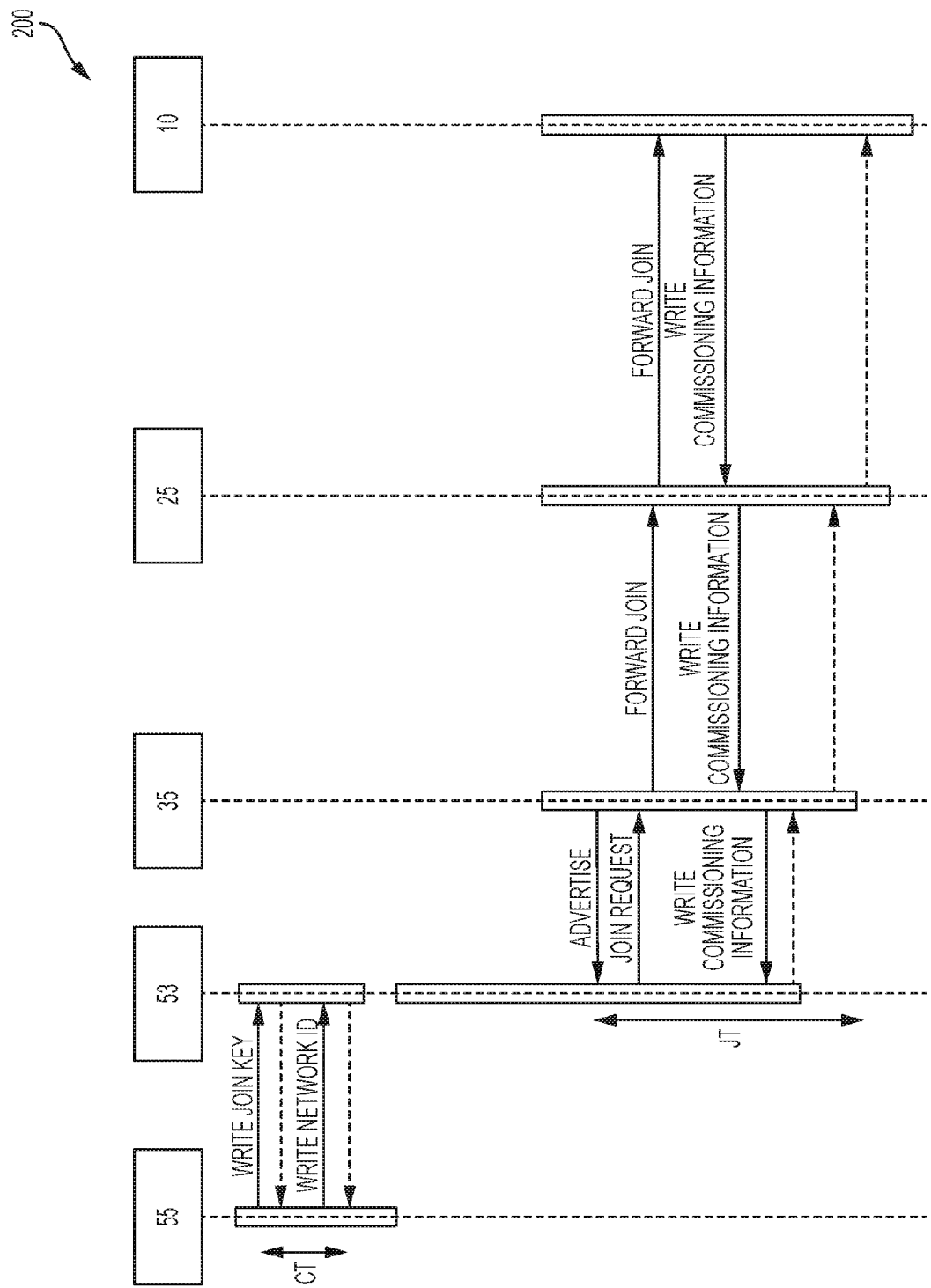
FIG. 2 is a timing diagram illustrating a method for commissioning and joining of a field device to a wireless sensor actuator network, in accordance with prior art.

FIG. 2 is a timing diagram illustrating a method 200 for commissioning and joining of a first field device to a wireless sensor actuator network, in accordance with prior art. The method 200 is divided into two parts: a first part involving configuration of the field device (indicated in the figure as CT, also referred to as configuration process) and a second part involving joining of the field device (indicated in the figure as JT, also referred to as joining process). During the first part, the configuration tool provides a network id of the network which the first field device is to become a part of, and the necessary join key required by the first field device to join the network. Upon receiving the network id and the corresponding join key, the field device sends respective acknowledgements (indicated in FIG. 2 with dotted arrows) to the configuration tool. This completes the configuration process.

Upon completion of the configuration process, the joining process starts. The first field device 53 lies in wait, listening for an advertise message from any neighboring device within range. Upon noticing the presence of an unconnected first field device 53 in the vicinity, the field device 35 sends an advertise message to the first field device 53. Upon receiving the advertise message, the first field device 53 sends a join request comprising the join key, to the neighboring field device 35. The field device 35 forwards the join request to the network manager located the configuration server 10 via the gateway 25. Upon receiving the join request, the network manager authenticates the join key of the join request to ensure that the request is from a valid field device. When the join key has been authenticated, the network manager generates the necessary commissioning information for the commissioning and joining the first field device to the wireless sensor actuator network. The generated commissioning information is transmitted from the network manager on the configuration server 10 to the first field device 53 via the gateway 25 and the neighboring field device 35.

The time taken to complete the above mentioned method 200 is a sum of a configuration time, which is time taken during the first part to initially configure the field device using a device maintenance port of the field device using the configuration tool, a joining time, which is time taken by the field device to become part of the wireless sensor actuator network. The duration of configuration time is often constant. The duration of joining time depends on availability of the network manager, network size, number of hops for a radio packet transmission, distance of device from the Gateway and some other device factors such as device processing speed. These factors are often indeterminate and therefore result in unpredictable joining time. In General, field devices take joining time typically 2-15 minutes or even more to get authenticated and to become part of the network. The joining time could be more if the network manager is busy and network size is more. The above mentioned method 200 does not allow a new field device to join the wireless sensor actuator network instantly and provide neighbor device list information for fast network formation. These concerns are addressed by the method provided by the current invention.

Figure 3:
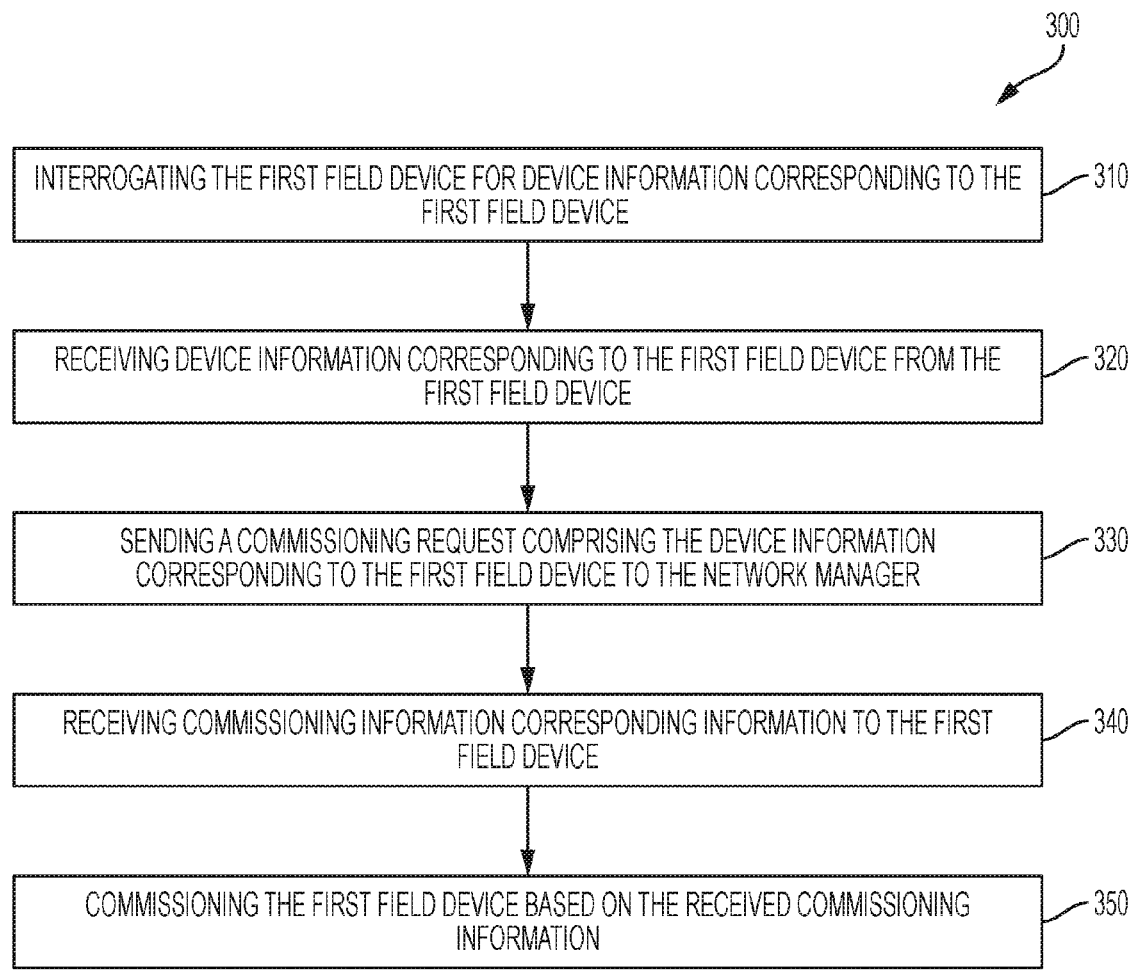
FIG. 3 illustrates a method for commissioning and joining of a field device to a wireless sensor actuator network, in accordance with the current invention.

FIG. 3 illustrates a method 300 for commissioning and joining of a field device to a wireless sensor actuator network using a configuration tool 55, in accordance with the current invention. At step 310, the configuration tool 55 interrogates the first field device 53 for device information corresponding to the first field device 53. At step 320, the configuration tool receives device information from the first field device 53.

At step 330, the configuration tool transmits a commissioning request comprising the received device information to the network manager. In an embodiment, the configuration tool determines the geographical location of the first field device 53 in the plant. The determined geographical information is included in the commissioning request. In another embodiment, the device information corresponding to the first field device 53 includes the geographical location of the first field device 53 in the plant. In yet another embodiment, the plant operator commissioning the first field device inputs the geographical location of the first field device 53 to the configuration tool. The input geographical information is included in the commissioning request.

Upon receiving the commissioning request from the configuration tool, the network manager determines whether the first field device is authorized to join the network by looking up the device information from a list of authorized field devices. After authentication of device information, the network manager generates commissioning information which includes routing information, a session key and a network key for the first field device. In an embodiment, the session key and the network key are generated using the MAC id of the first field device 53. The session key is used for pairwise communications with the network manager and the network key is used in data link layer service for hop-to-hop authentication. After allocating session key and network key, network manager updates routing tables in the wireless sensor network on the basis of the geographical location of the first field device 53. Routing tables contain network information of the field devices in a graph format where the field devices are represented by nodes and the connections between them represented by edges or links having ids.

Then, on the basis of the geographical location of the first field device 53, the network manager generates routing information for the first field device, in which list of neighboring field devices and corresponding network information (such as graph ids in the mesh) are specified. The list neighbor device will be determined by network manager using the geographical location of first field device and the approximate distance from neighboring devices on the basis of the routing tables or a plant facility map.

The generated commissioning information is transmitted by the network manager to the configuration tool 55. The configuration tool commissions the first field device 53 using the received commissioning information. Along with session key and network key, the configuration tool configures the routing information in the first field device. Configuring the routing information during commissioning phase eliminates the need for the first field device to wait for advertise messages from neighboring field devices and eliminates the neighbor searching operation.

Once the first field device 53 is configured with session key, network key and routing information, after commissioning the first field device will start sending the process data directly to the gateway and works as plug and play device.

In an embodiment, the network manager maintains two device list tables: Authenticated Device List (ADL) and Session Allocated Device List (SADL). ADL table is for the devices which are connected to the Gateway and part of wireless sensor actuator network and SADL table is for the devices for which commissioning information has been generated. The devices which are in SADL, after becoming part of wireless sensor actuator Network, are moved from SADL to ADL table. In an embodiment, the session key includes a timeout attribute. When the session key expires or is depreciated, the same key can be transformed as join key automatically. When a field device receives a message having an expired or depreciated session key, the field device treats the message as a join request and follows the method 200.

Any standard method for data encryption-decryption like public private key maybe implemented for security. Additionally, it can be noted by a person skilled in the art that the network manager can be located on a configuration server 10 or on the gateway 25.

Figure 4:
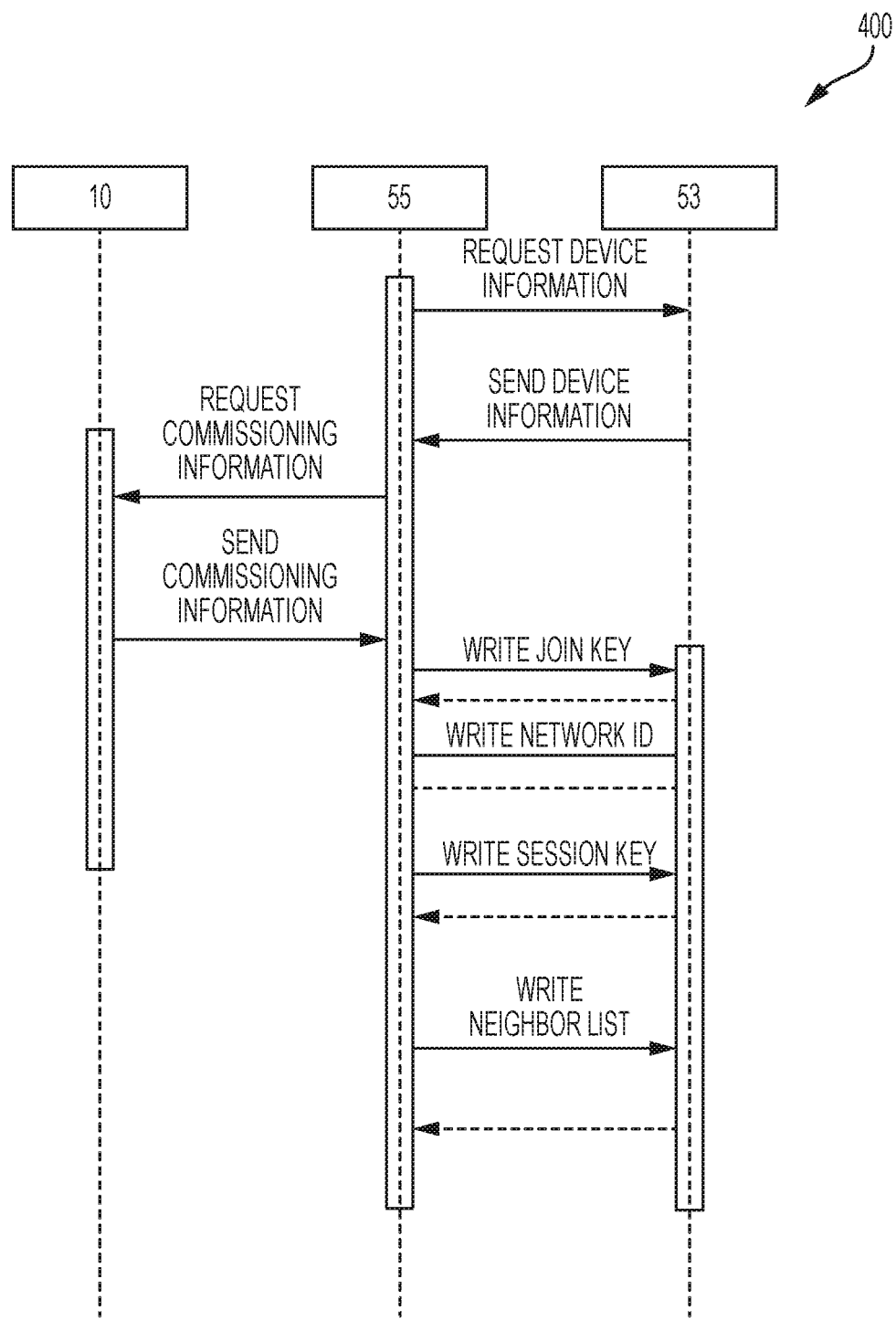
FIG. 4 shows timing diagram illustrating a method for commissioning and joining of a field device to a wireless sensor actuator network, in accordance with the present invention.
Figure 5:
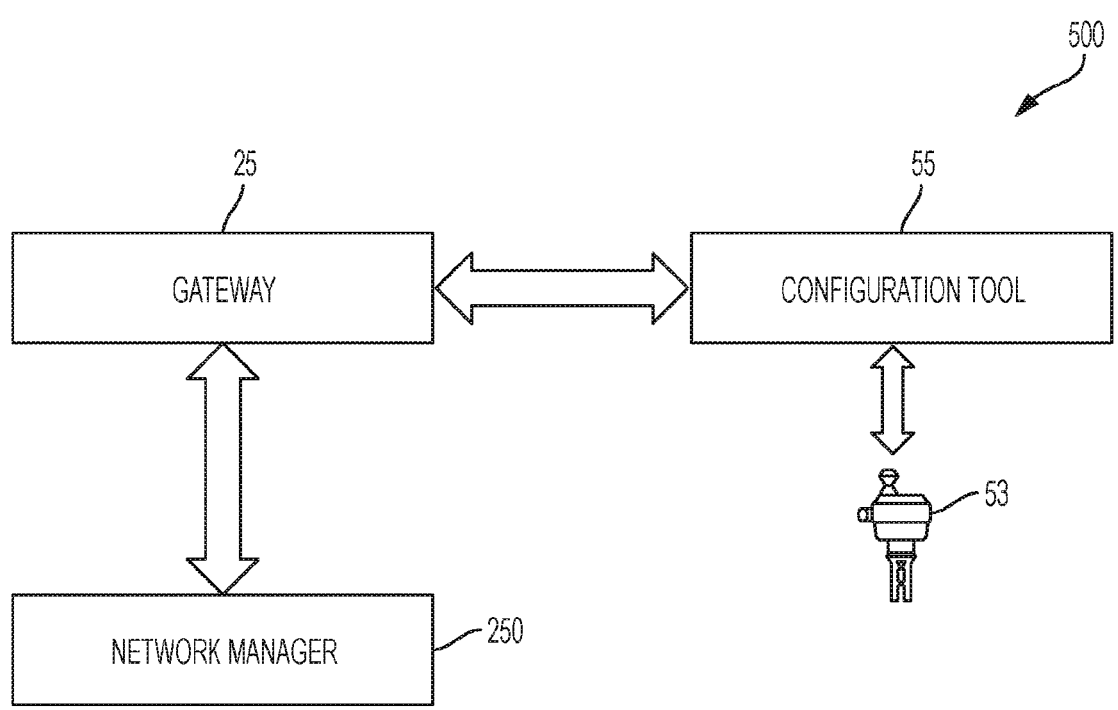
FIG. 5 illustrates a block diagram for commissioning and joining of a field device to a wireless sensor actuator network, in accordance with the present invention.

FIG. 4 shows a timing diagram illustrating a method for commissioning and joining of a field device to a wireless sensor actuator network, in accordance with the present invention. The In FIG. 5, a simplified block diagram of a system 500 for joining and commissioning of a first field device 53 to a wireless sensor actuator network is shown. The system 500 comprises a gateway 25, a network manager 250, a configuration tool 55 and the first field device 53. The network manager 250 is provided for generating field device credentials and may reside either inside or outside the gateway 25. In an embodiment where the network manager is housed outside the gateway 25. In another embodiment, the network manager is an external component connected to the gateway 25. The first field device 53 is connected to a wireless adapter (not shown in figure) and the first field device 53 maybe wireless or wired in a field bus.

The network manager 250 is provided with a plant facility map. The plant facility map comprises locations of the plurality of field devices. The network manager 250 utilizes the plant facility map for determining the list of the neighbor field devices. The configuration tool 55 interrogates the field device for device information and provides the device information to the network manager 250. In an embodiment device information includes location for commissioning of the first field device 53 and the unique identification of the first field device 53. In an embodiment the unique identification is the media access control (also referred to as "MAC") address of the first field device 53.

In an embodiment the network manager 250 is provided with the information related to the first field device 53 from the configuration tool 55 via the gateway 25. Then, the network manager 250 is requested by the configuration tool 55 for generating field device credentials. The field device credentials like network ID, join key, session key, network key, Graph ID, slot number and list of neighbor devices is generated by the network manager 250. The network manager 250 transmits the field device credentials to the configuration tool 55 via the gateway 25. The configuration tool commissions the first field device 53 using the commissioning information.

Thus, the current invention reduces the joining time by preconfigured key management mechanism using the configuration tool. In commissioning phase, device will be configured with commissioning information including network credentials such network id, join key, session key, network key, graph IDs and the list of neighboring field devices, etc. After commissioning, the first field device 53 is capable of sending data to Gate-way without lengthy joining process and searching for neighboring field devices. The time for joining of a field device to a wireless sensor actuator network is reduced considerably due to the generation of network credentials and routing information by the network manager during commissioning, and configuring of the said field device by the configuration tool using the generated information.

Only certain features of the invention have been specifically illustrated and described herein, and many modifications and changes will occur to those skilled in the art. The invention is not restricted by the preferred embodiment described herein in the description. It is to be noted that the invention is explained by way of exemplary embodiment and is neither exhaustive nor limiting. Certain aspects of the invention that not been elaborated herein in the description are well understood by one skilled in the art. Also, the terms relating to singular form used herein in the description also include its plurality and vice versa, wherever applicable. Any relevant modification or variation, which is not described specifically in the specification are in fact to be construed of being well within the scope of the invention. The appended claims are intended to cover all such modifications and changes which fall within the spirit of the invention.

We claim:

1. A method for commissioning and joining of a first field device to a wireless sensor actuator network in a process plant using a configuration tool, wherein the wireless sensor actuator network comprises a plurality of interconnected field devices and gateway for connecting the plurality of interconnected field devices to a plant automation network comprising a plurality of controllers and a network manager, wherein the configuration tool performs the method comprising:
    a) receiving device information associated with the first field device, wherein the device information comprises a unique device identifier associated with the first field device;
    b) transmitting a commissioning request for the first field device, wherein the commissioning request comprises the received device information associated with the first field device, and geographical location information of the first field device;
    c) receiving commissioning information for the first field device, wherein the commissioning information comprises a session key for pairwise communication between the first field device and the network manager, a network key for hop-to-hop authentication in a data link layer service by the first field device, and routing information corresponding to the first field device; wherein the routing information comprises a list of neighboring field devices within a predetermined wireless communication range of the first field device, wherein the session key and the network key are generated based on the unique device identifier associated with the first field device, and wherein the list of neighboring field devices is generated based on the geographical location of the first field device and at least one of routing table and plant facility map; and
    d) commissioning the first field device using the received commissioning information for joining the first field device to the wireless sensor actuator network.

2. A method for commissioning and joining of a first field device to a wireless sensor actuator network in a process plant using a configuration tool, wherein the wireless sensor actuator network comprises a plurality of interconnected field devices and gateway for connecting the plurality of interconnected field devices to a plant automation network comprising a plurality of controllers and a network manager, wherein the configuration tool performs the method comprising:
    a) receiving device information associated with the first field device, wherein the device information comprises a unique device identifier associated with the first field device;
    b) transmitting a commissioning request for the first field device, wherein the commissioning request comprises the received device information associated with the first field device, and geographical location information of the first field device;
    c) receiving commissioning information for the first field device, wherein the commissioning information comprises a session key, a network key, and routing information corresponding to the first field device; wherein the routing information comprises a list of neighboring field devices within a predetermined wireless communication range of the first field device;
    d) commissioning the first field device using the received commissioning information for joining the first field device to the wireless sensor actuator network; and
    e) depreciating the session key by the network manager after a predetermined duration of time.

3. The method as claimed in claim 1, further comprising sending process data to a controller from the plurality of controllers by the first field device, upon joining the wireless sensor actuator network.

4. The method as claimed in claim 2, further comprising setting a joining key to the depreciated session key by the network manager.

5. A system for commissioning and joining of a first field device to a wireless sensor actuator network in a process plant, wherein the wireless sensor actuator network comprises a plurality of interconnected field devices and a gateway for connecting the plurality of interconnected field devices to a plant automation network comprising a plurality of controllers, the system comprising:
    a) a network manager communicatively coupled to the gateway and configured to generate a session key based on a unique device identifier associated with the first field device and to generate routing information including a list of neighboring field devices based on geographical location of the first field device, the network manager comprising an Authenticated Device List (ADL) comprising a listing of one or more field devices of the wireless sensor actuator network and a session allocated device list comprising a listing of one or more field devices having commissioning information generated therefor; and b) a configuration tool configured to
  i) receive device information associated with the first field device, wherein the device information comprises the unique device identifier associated with the first field device;
  ii) transmit a commissioning request for the first field device, wherein the commissioning request comprises the received device information associated with the first field device, and geographical location information of the first field device;
  iii) receive commissioning information for the first field device, wherein the commissioning information comprises the session key, a network key, and routing information corresponding to the first field device; wherein the routing information comprises a list of neighboring field devices within a predetermined wireless communication range of the first field device; and
  iv) commission the first field device using the received commissioning information for joining the first field device to the wireless sensor actuator network.

6. The system as claimed in claim 5, where the first field device is configured to send process data to a controller from the plurality of controllers, upon joining the wireless sensor actuator network via the gateway.

* * * * *